United States Patent
Tanna et al.

(10) Patent No.: US 10,632,417 B2
(45) Date of Patent: Apr. 28, 2020

(54) HIGH HYDROCARBON RECOVERY MEMBRANE PLUS SOLVENT BASED SYSTEM

(71) Applicant: UOP LLC, Des Plaines, IL (US)

(72) Inventors: Nikunj Prataprai Tanna, Kuala Lumpur (MY); W. Jay Lechnick, Glen Ellyn, IL (US)

(*) Notice: Subject to any disclaimer, the term of this patent is extended or adjusted under 35 U.S.C. 154(b) by 165 days.

(21) Appl. No.: 15/878,261

(22) Filed: Jan. 23, 2018

(65) Prior Publication Data
US 2019/0224618 A1 Jul. 25, 2019

(51) Int. Cl.
*B01D 53/22* (2006.01)
*C10L 3/10* (2006.01)
*C01B 3/52* (2006.01)
*C01B 3/56* (2006.01)
*B01D 53/14* (2006.01)
(Continued)

(52) U.S. Cl.
CPC ....... *B01D 53/229* (2013.01); *B01D 53/1425* (2013.01); *B01D 53/1443* (2013.01); *B01D 53/1456* (2013.01); *B01D 53/1475* (2013.01); *B01D 53/265* (2013.01); *B01D 53/78* (2013.01); *C01B 3/52* (2013.01); *C01B 3/56* (2013.01); *C10L 3/101* (2013.01); *C10L 3/103* (2013.01); *C10L 3/104* (2013.01); *B01D 2252/20* (2013.01); *B01D 2252/2023* (2013.01); *B01D 2252/2025* (2013.01); *B01D 2252/20478* (2013.01); *B01D 2256/16* (2013.01); *B01D 2256/20* (2013.01); *B01D 2256/245* (2013.01); *B01D 2257/304* (2013.01); *B01D 2257/308* (2013.01); *B01D 2257/504* (2013.01); *B01D 2257/80* (2013.01); *B01D 2258/0283* (2013.01); *B01D 2258/05* (2013.01);
(Continued)

(58) Field of Classification Search
CPC ............ B01D 53/1425; B01D 53/1443; B01D 53/1462; B01D 53/1475; B01D 53/229; C01L 3/101; C01L 3/102; C01L 3/104; C01B 2203/0405; C01B 2203/041; C01B 2203/0415
See application file for complete search history.

(56) References Cited

U.S. PATENT DOCUMENTS 3,133,132 A    5/1964   Sidney et al.
4,772,295 A *   9/1988   Kato .................. B01D 53/1443
                                                                                585/819
(Continued)

FOREIGN PATENT DOCUMENTS

| CN | 104379236 A | 2/2015 |
| JP | 2005290151 A | 10/2005 |
| WO | 2012092980 A1 | 7/2012 |

OTHER PUBLICATIONS

Lokhandwala et.al., Low-Quality Natural Gas Sulfur Removal/Recovery System, Conference Title: Fuels Technology Contractors Review Meeting, Conference Location: Morgantown, West Virginia, Conference Dates: Nov. 16-18, 1993; 7 Pages.

*Primary Examiner* — Jason M Greene

(57) ABSTRACT

A process is provided for treating a hydrocarbon gas stream comprising sending the hydrocarbon gas stream to a membrane unit to be separated into a residue stream and a permeate gas stream; then sending the permeate gas stream with or without undergoing compression to a solvent absorption unit to remove carbon dioxide and other impurities; and recovering a treated gas.

17 Claims, 2 Drawing Sheets

(51) Int. Cl.
*B01D 53/26* (2006.01)
*B01D 53/78* (2006.01)

(52) U.S. Cl.
CPC .......... *C01B 2203/0405* (2013.01); *C01B 2203/0415* (2013.01); *C10L 2290/541* (2013.01); *C10L 2290/548* (2013.01)

(56) References Cited

U.S. PATENT DOCUMENTS

| | | |
|---|---|---|
| 4,855,048 A | 8/1989 | Tang et al. |
| 5,407,466 A | 4/1995 | Lokhandwala et al. |
| 6,416,568 B1 | 7/2002 | Wallace et al. |
| 7,424,808 B2 | 9/2008 | Mak |
| 8,414,683 B2 | 4/2013 | Zhou et al. |
| 8,454,727 B2 | 6/2013 | Dunne et al. |
| 8,728,201 B2 | 5/2014 | Nazarko et al. |
| 9,205,382 B2 | 12/2015 | Sawamura et al. |
| 9,409,120 B2 | 8/2016 | Liu et al. |
| 2008/0011161 A1* | 1/2008 | Finkenrath ......... B01D 53/1475 96/4 |
| 2011/0290111 A1* | 12/2011 | Dunne ............... B01D 53/1443 95/51 |
| 2012/0325089 A1* | 12/2012 | Udatsu ............... B01D 53/1475 95/179 |
| 2015/0122122 A1* | 5/2015 | W Mustapa ....... B01D 53/1475 95/51 |
| 2015/0190748 A1* | 7/2015 | Liu ..................... B01D 53/229 95/51 |
| 2019/0054415 A1* | 2/2019 | Maher ................ B01D 53/1462 |

\* cited by examiner

HIGH HYDROCARBON RECOVERY MEMBRANE PLUS SOLVENT BASED SYSTEM

BACKGROUND OF THE INVENTION

The invention relates to an environmentally friendly and cost effective system and process for treating natural gas.

For natural gas sweetening applications where hydrocarbon recovery is of prime importance to the customer, the current solutions of a two stage membrane system or a stand-alone amine guard formulated solvent (AGFS) system do not offer a cost effective, environment friendly and high hydrocarbon recovery solution. There exist numerous natural gas sweetening opportunities in the world (especially in the Southeast Asia region), where there is a need to provide a technological solution that would meet all customer expectations including high hydrocarbon recovery, environmentally friendly, and cost effectiveness.

A two-stage membrane system offers reasonably high hydrocarbon recovery as compared to a single stage system, but the hydrocarbon content of the permeate stream from the two-stage system makes it unacceptable for venting. Similarly, a stand-alone AGFS unit can offer the best in class hydrocarbon recovery with an acid gas stream with extremely low hydrocarbon content, but it may not be a cost effective solution to a customer's requirements.

The flow scheme of the present invention offers nearly 100% hydrocarbon recovery, and it is environmentally friendly and cost effective.

SUMMARY OF THE INVENTION

The invention provides a process for treating a hydrocarbon gas stream comprising sending the gas stream to a membrane unit to be separated into a residue stream and a permeate gas stream, followed by sending the permeate gas stream without undergoing compression to a solvent absorption unit to remove carbon dioxide and other impurities; and recovering a treated gas. The hydrocarbon gas stream may be natural gas, synthesis gas, flue gas or biogas. Greater than 99.5 wt % of the hydrocarbons in the hydrocarbon gas stream are recovered. In some embodiments of the invention greater than about 99.9 wt % of hydrocarbons in the hydrocarbon gas stream are recovered. The hydrocarbon gas stream may be treated to remove water and other contaminants before being sent to said membrane unit. The permeate gas stream may be cooled and liquid is then removed from the permeate gas stream before passing to the solvent absorption unit. The process includes regenerating the solvent in the solvent absorption unit. During the regeneration of the solvent, acid gas is removed from a solvent in the absorption unit such as shown in FIG. 2. The treated gas may be washed. The process conditions include having the feed at a temperature from about 60° F. to about 140° F., the residue at a temperature from about 80° F. to about 180° F. and the permeate at a temperature from about 40° F. to about 190° F. The feed is at a pressure of about 300 psig to 1100 psig and the permeate is at a pressure from about 10 psig to 300 psig. The treated gas may comprise 2-30% impurities of the feed gas. The solvent absorption unit may contain an amine solvent selected from the group consisting of methyldiethanolamine (MDEA), piperazine, diethanolamine (DEA), monoethanolamine (MEA), triethanolamine (TEA), diglycolamine (DGA), diisopropanolamine (DIPA) and mixtures thereof. Non-amine based solvents may also be used such as triethylene glycol or dimethyl ethers of polyethylene glycol, as well as other solvents that are known to be useful in treatment of natural gas. The solvent used in the Benfield Process, a hot potassium carbonate, may also be used in the present invention. The impurities that are removed include carbon dioxide, hydrogen sulfide, and carbonyl sulfide. The water in the acid gas may be condensed and then a portion of the acid gas is sent to be flared. In addition, a portion of the acid gas may be recycled to the solvent absorption unit. The treated gas may be cooled and then sent through a water wash before exiting.

DETAILED DESCRIPTION OF THE INVENTION

Figure 1:
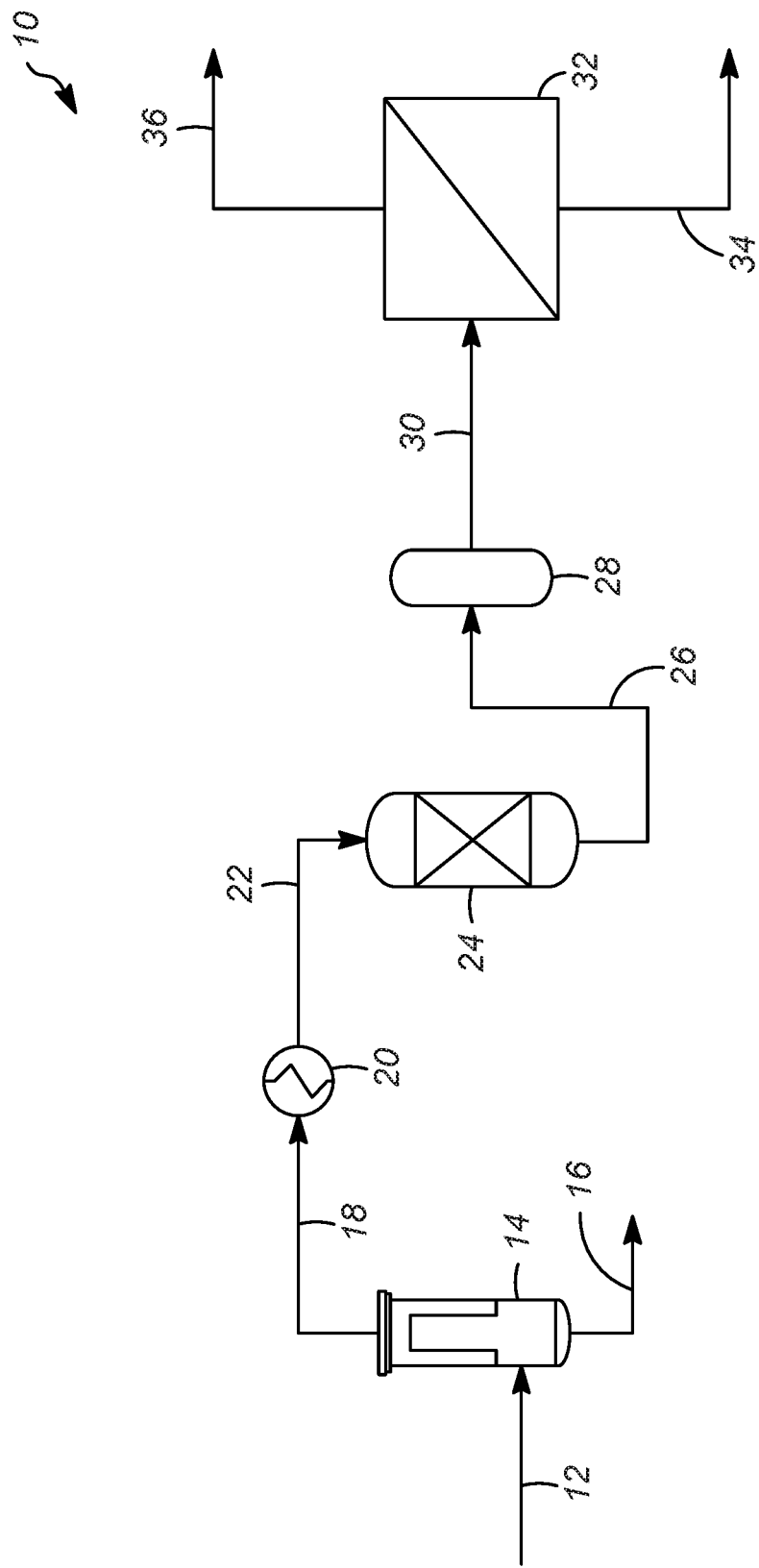
FIG. 1 shows a membrane system used to purify a hydrocarbon stream.
Figure 2:
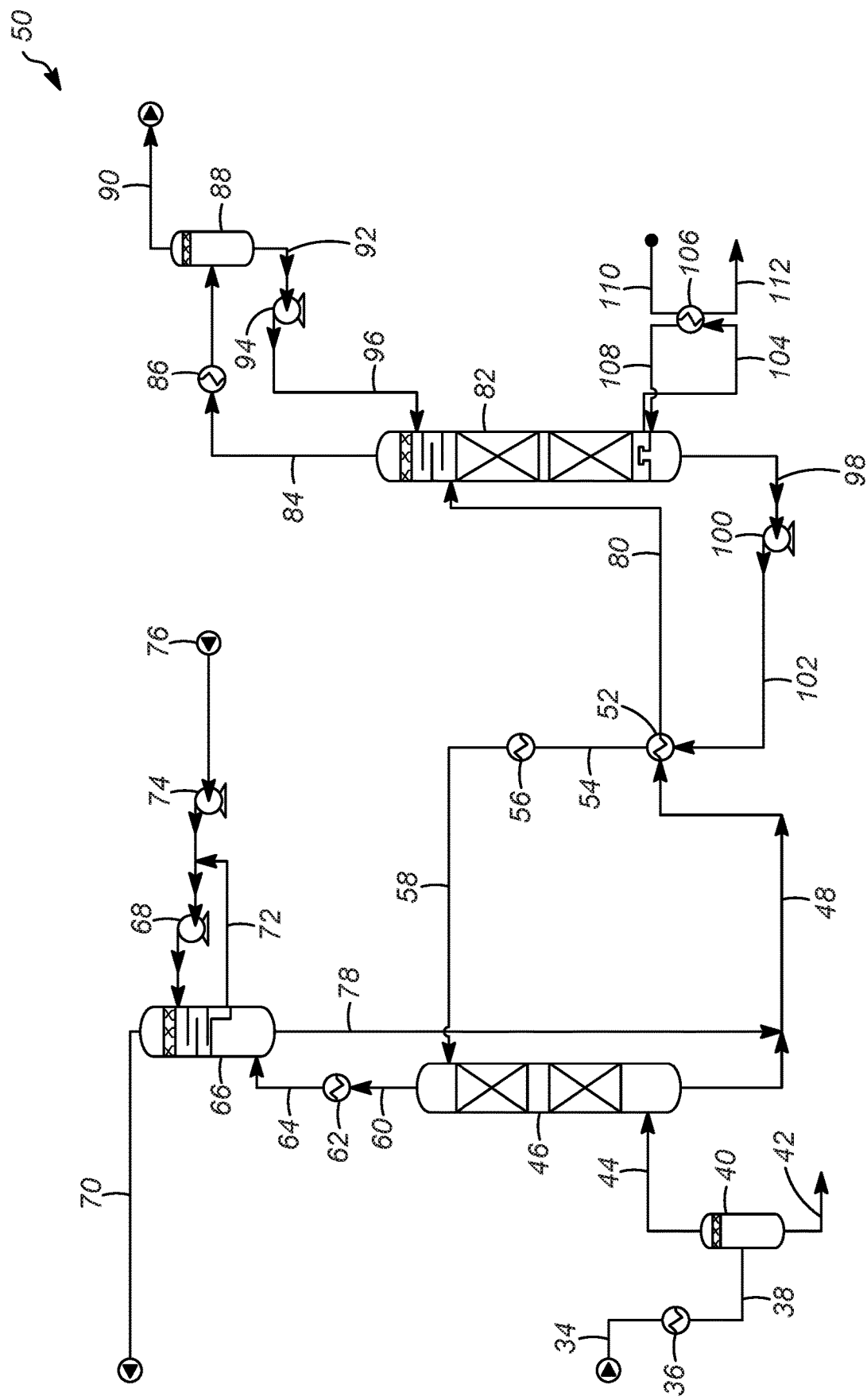
FIG. 2 shows a solvent based system to purify the hydrocarbon stream after passing through the membrane system.

The flow scheme of the present invention is divided into two parts shown in FIGS. 1 and 2 where the permeate gas stream 34 from FIG. 1 is the feed to the amine guard formulated solvent system shown in FIG. 2. FIG. 1 illustrates the first stage of the membrane system 10 with a hydrocarbon feed stream 12 passing through a filter coalescer 14 with a condensate 16 exiting the system and a treated hydrocarbon stream 18 being heated by preheater 20 and heated hydrocarbon stream 22 passing through guard bed 24. Stream 26 then is shown passing through particle filter 28 and then stream 30 is sent to membrane unit 32 to produce a permeate stream 34 and a residue stream 36.

FIG. 2 illustrates the AGFS system used to further process the hydrocarbon stream. The permeate stream 34 is cooled by a feed gas cooler 36 with cooled permeate stream then passing through a feed gas knock out drum 40 with liquid condensate 42 exiting the system and stream 44 then entering a bottom section of amine absorber unit 46. However, in some embodiments of the invention, permeate stream 34 is not cooled. A product gas 60 exits the top portion of amine absorber 46. Product gas 60 passes through product gas cooler 62 with stream 64 then passing through treated gas wash drum 66 and a treated gas stream 70 exiting. Also shown is a water wash pump 68, make up water pump 74, make up water 76 and water stream 72 exiting treated gas wash drum 66. FIG. 2 further shows a stream 78 exiting the bottom of treated gas wash drum 66 to be combined with stream 48 exiting the bottom of amine absorber 46. Stream 48 then passes lean rich exchanger 52 to enter an amine regenerator 82 where heating with steam produced in the reboiler 106 results in an overhead waste stream 84 that passes to overhead condenser 86 to reflux drum 88 with acid gas stream 90 being sent to flare/incinerator/sulfur recovery unit. A bottom stream 92 from reflux drum 88 is sent to pump 94 to stream 96 that is sent to amine regenerator 82 that is heated by a heated liquid such as water, steam or hot oil 110 that passes through reboiler 106 heating stream 104 to result in stream 108 with hot oil return stream 112 as shown. A lean solvent stream 98 is pumped by lean solution pump 100 to stream 102 to lean amine cooler 56 to stream 58 to be returned to amine absorber 46.

The membrane unit may be fabricated as an asymmetric membrane with a flat sheet or hollow fiber geometry by phase inversion followed by direct air drying through the use of at least one drying agent which is a hydrophobic organic compound such as a hydrocarbon or an ether (see U.S. Pat. No. 4,855,048). The membrane in the present invention can also be fabricated as an asymmetric membrane with flat sheet or hollow fiber geometry by phase inversion followed by solvent exchange methods (see U.S. Pat. No. 3,133,132). Other methods as known to those skilled in the art may be used to make the membranes used in the present invention.

Typical polymers that serve in the membrane can be selected from, but not limited to, polysulfones; sulfonated polysulfones; polyethersulfones (PESs); sulfonated PESs; polyethers; polyetherimides such as Ultem (or Ultem 1000) sold under the trademark Ultem®, manufactured by Sabic Innovative Plastics, poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose; polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide/imides; polyketones, polyether ketones; poly (arylene oxide)s such as poly(phenylene oxide) and poly (xylene oxide); poly(esteramide-diisocyanate); polyurethanes; polyesters (including polyarylates), such as poly (ethylene terephthalate), poly(alkyl methacrylate)s, poly (acrylate)s, poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl ester)s such as poly(vinyl acetate) and poly(vinyl propionate), poly(vinyl pyridine)s, poly(vinyl pyrrolidone)s, poly(vinyl ether)s, poly(vinyl ketone)s, poly(vinyl aldehyde)s such as poly(vinyl formal) and poly(vinyl butyral), poly(vinyl amide)s, poly(vinyl amine)s, poly(vinyl urethane)s, poly (vinyl urea)s, poly(vinyl phosphate)s, and poly(vinyl sulfate)s; polyallyls; poly(benzobenzimidazole)s; polybenzoxazoles; polyhydrazides; polyoxadiazoles; polytriazoles; poly (benzimidazole)s; polycarbodiimides; polyphosphazines; microporous polymers; and interpolymers, including block interpolymers containing repeating units from the above such as interpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acryl groups and the like.

Some preferred polymers that can serve as the polymer matrix include, but are not limited to, polysulfones, sulfonated polysulfones, polyethersulfones (PESs), sulfonated PESs, poly(vinyl alcohol)s, polyetherimides such as Ultem (or Ultem 1000) sold under the trademark Ultem®, manufactured by Sabic Innovative Plastics, cellulosic polymers such as cellulose acetate and cellulose triacetate, polyamides, polyimides such as Matrimid sold under the trademark Matrimid® by Huntsman Advanced Materials (Matrimid® 5218 refers to a particular polyimide polymer sold under the tradename Matrimid®), P84 or P84HT sold under the tradename P84 and P84HT respectively from HP Polymers GmbH, poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), poly(3,3',4,4'-diphenylsulfone tetracarboxylic dianhydride-pyromellitic dianhydride-3,3',5,5'-tetramethyl-4,4'-methylene dianiline) (poly(D SDA-PMDA-TMMDA)), poly[2,2'-bis-(3,4-dicarboxyphenyl)hexafluoropropane dianhydride-1,3-phenylenediamine] (poly(6FDA-m-PDA)), poly[2,2'-bis-(3,4-dicarboxyphenyl) hexafluoropropane dianhydride-1,3-phenylenediamine-3,5-diaminobenzoic acid)] (poly(6FDA-m-PDA-DABA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(B TDA-PMDA-ODPA-TMMDA)), poly[2,2'-bis-(3,4-dicarboxyphenyl)hexafluoropropane dianhydride-2,2-bis(3-amino-4-hydroxyphenyl)-hexafluoropropane] (poly(6FDA-bis-AP-AF)), polyamide/imides, polyketones, polyether ketones, and polymers of intrinsic microporosity.

The most preferred polymers that can serve as the continuous polymer matrix include, but are not limited to, polyimides such as Matrimid®, P84®, poly(BTDA-PMDA-TMMDA), poly(BTDA-PMDA-ODPA-TMMDA), poly (DSDA-TMMDA), poly(BTDA-TMMDA), poly(6FDA-bis-AP-AF), and poly(DSDA-PMDA-TMMDA), polyetherimides such as Ultem®, polyethersulfones, polysulfones, cellulose acetate, cellulose triacetate, poly(vinyl alcohol)s, polybenzoxazoles, and polymers of intrinsic microporosity.

EXAMPLE

The following battery limit material balance represents a hydrocarbon stream treated by the system shown in FIG. 1.

TABLE 1

| Stream Name | Feed | Residue | Permeate |
| --- | --- | --- | --- |
| Molar Flow, MMSCFD | 100 | 72 | 28 |
| Pressure, psig | 850 | 802 | 61 |
| Temperature, ° F. | 100.4 | 134.2 | 141.9 |
| Higher Heating Value, Btu/scf | 920.1 | 1071.6 | 520.1 |
| Lower Heating Value, Btu/scf | 832.6 | 970.4 | 468.4 |
| Hydrocarbon dewpoint | 106.8 | 119.1 | −53.1 |
| Molecular weight | 24 | 21 | 29 |
| Component, mol % | | | |
| Carbon dioxide | 15.96 | 5.00 | 43.97 |
| Nitrogen | 6.24 | 6.52 | 5.51 |
| Methane | 69.33 | 77.27 | 48.73 |
| Ethane | 3.80 | 4.88 | 1.01 |
| Propane | 2.60 | 3.52 | 0.21 |
| i-Butane | 0.45 | 0.62 | 0.01 |
| n-Butane | 0.66 | 0.91 | 0.02 |
| i-Pentane | 0.20 | 0.28 | 0.00 |
| n-Hexane | 0.19 | 0.26 | 0.00 |
| n-Heptane | 0.29 | 0.38 | 0.00 |
| n-Octane | 0.07 | 0.09 | 0.00 |
| n-Nonane | 0.01 | 0.01 | 0.00 |
| Water | 0.00 | 0.02 | 0.53 |

The battery Limit Material Balance after passing through the system in FIG. 2 was as follows:

TABLE 2

|  | Total Feed Gas | Total Treated Gas | Acid Gas | Make-up Water |
|---|---|---|---|---|
| Temperature, ° F. | 142 | 123 | 124 | 104 |
| Pressure, psig | 61 | 50 | 8 | 50 |
| Total flow, lb-mol/hr | 3,087 | 2,415 | 783 | 113 |
| Total flow, lb/hr | 90,227 | 59,319 | 32,905 | 2,029 |
| Component, mol % | | | | |
| $N_2$ | 5.51 | 7.04 | <0.01 | <0.01 |
| $CO_2$ | 43.97 | 26.23 | 92.36 | <0.01 |
| $H_2O$ | 0.53 | 2.88 | 7.56 | 100 |
| $CH_4$ | 48.73 | 62.24 | 0.07 | <0.01 |
| $C_2H_6$ | 1.01 | 1.29 | <0.01 | <0.01 |
| $C_3H_8$ | 0.21 | 0.27 | <0.01 | <0.01 |
| N-C4 | 0.03 | 0.04 | <0.01 | <0.01 |
| N-C5 | 0.01 | 0.01 | <0.01 | <0.01 |

Specific Embodiments

While the following is described in conjunction with specific embodiments, it will be understood that this description is intended to illustrate and not limit the scope of the preceding description and the appended claims.

A first embodiment of the invention is a process for treating a hydrocarbon gas stream comprising sending the hydrocarbon gas stream to a membrane unit to be separated into a residue stream and a permeate gas stream; sending the permeate gas stream to a solvent absorption unit to remove carbon dioxide and other impurities; and recovering a treated gas. An embodiment of the invention is one, any or all of prior embodiments in this paragraph up through the first embodiment in this paragraph wherein the permeate gas stream is not compressed before being sent to the solvent absorption unit. An embodiment of the invention is one, any or all of prior embodiments in this paragraph up through the first embodiment in this paragraph wherein the permeate gas stream is compressed before being sent to the solvent absorption unit. An embodiment of the invention is one, any or all of prior embodiments in this paragraph up through the first embodiment in this paragraph wherein the hydrocarbon gas stream is selected from the group consisting of natural gas, synthesis gas, flue gas and biogas. An embodiment of the invention is one, any or all of prior embodiments in this paragraph up through the first embodiment in this paragraph wherein greater than 99.5 wt % of hydrocarbons in the hydrocarbon gas stream are recovered. An embodiment of the invention is one, any or all of prior embodiments in this paragraph up through the first embodiment in this paragraph wherein greater than about 99.9 wt % of hydrocarbons in the hydrocarbon gas stream are recovered. An embodiment of the invention is one, any or all of prior embodiments in this paragraph up through the first embodiment in this paragraph wherein the hydrocarbon gas stream is treated to remove water and other contaminants before being sent to the membrane unit. An embodiment of the invention is one, any or all of prior embodiments in this paragraph up through the first embodiment in this paragraph further comprising regenerating the solvent in the solvent absorption unit. An embodiment of the invention is one, any or all of prior embodiments in this paragraph up through the first embodiment in this paragraph further comprising washing the treated gas. An embodiment of the invention is one, any or all of prior embodiments in this paragraph up through the first embodiment in this paragraph wherein the permeate gas stream is cooled and liquid is then removed from the permeate gas stream before passing to the solvent absorption unit. An embodiment of the invention is one, any or all of prior embodiments in this paragraph up through the first embodiment in this paragraph wherein during the regenerating of the solvent, acid gas is removed from a solvent in the absorption unit. An embodiment of the invention is one, any or all of prior embodiments in this paragraph up through the first embodiment in this paragraph wherein the feed is at a temperature from about 60° F. to about 140° F., the residue is at a temperature from about 80° F. to about 180° F. and the permeate is at a temperature from about 40° F. to about 190° F. An embodiment of the invention is one, any or all of prior embodiments in this paragraph up through the first embodiment in this paragraph wherein the feed is at a pressure of about 300 psig to 1100 psig and the permeate is at a pressure from about 10 psig to 300 psig. An embodiment of the invention is one, any or all of prior embodiments in this paragraph up through the first embodiment in this paragraph wherein the treated gas comprises 2-30% impurities of the feed gas. An embodiment of the invention is one, any or all of prior embodiments in this paragraph up through the first embodiment in this paragraph wherein the solvent absorption unit contains a solvent selected from the group consisting of methyldiethanolamine (MDEA), piperazine, diethanolamine (DEA), monoethanolamine (MEA), triethanolamine (TEA), diglycolamine (DGA), diisopropanolamine (DIPA), triethylene glycol, dimethyl ethers of polyethylene glycol and mixtures thereof. An embodiment of the invention is one, any or all of prior embodiments in this paragraph up through the first embodiment in this paragraph wherein the impurities are selected from the group consisting of carbon dioxide, hydrogen sulfide, and carbonyl sulfide. An embodiment of the invention is one, any or all of prior embodiments in this paragraph up through the first embodiment in this paragraph wherein water in the acid gas is condensed and then a portion of the acid gas is sent to be flared, incinerated or routed to a sulfur recovery unit. An embodiment of the invention is one, any or all of prior embodiments in this paragraph up through the first embodiment in this paragraph wherein a portion of the acid gas is recycled to the solvent absorption unit. An embodiment of the invention is one, any or all of prior embodiments in this paragraph up through the first embodiment in this paragraph wherein the treated gas is cooled and then sent through a water wash before exiting.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A process for treating a hydrocarbon gas stream comprising:
    sending said hydrocarbon gas stream to a membrane unit to be separated into a residue stream and a permeate gas stream;

sending said permeate gas stream to a solvent absorption unit to remove carbon dioxide and other impurities; and
recovering a treated gas;
wherein said hydrocarbon gas stream is at a temperature from about 16° C. (60° F.) to about 60° C. (140° F.), said residue is at a temperature from about 27° C. (80° F.) to about 82° C. (180° F.) and said permeate is at a temperature from about 4° C. (40° F.) to about 88° C. (190° F.), and wherein greater than 99.5 wt % of hydrocarbons in said hydrocarbon gas stream are recovered.

2. The process of claim 1 wherein said permeate gas stream is not compressed before being sent to said solvent absorption unit.

3. The process of claim 1 wherein said permeate gas stream is compressed before being sent to said solvent absorption unit.

4. The process of claim 1 wherein said hydrocarbon gas stream is selected from the group consisting of natural gas, synthesis gas, flue gas and biogas.

5. The process of claim 1 wherein greater than about 99.9 wt % of hydrocarbons in said hydrocarbon gas stream are recovered.

6. The process of claim 1 wherein said hydrocarbon gas stream is treated to remove water and other contaminants before being sent to said membrane unit.

7. The process of claim 1 further comprising regenerating the solvent in said solvent absorption unit.

8. The process of claim 1 further comprising washing said treated gas.

9. The process of claim 1 wherein said permeate gas stream is cooled and liquid is then removed from said permeate gas stream before passing to said solvent absorption unit.

10. The process of claim 7 wherein during said regenerating of said solvent, acid gas is removed from a solvent in said absorption unit.

11. The process of claim 1 wherein said hydrocarbon gas stream is at a pressure of about 2068 kPa (300 psig) to 7584 kPa (1100 psig) and said permeate is at a pressure from about 69 kPa (10 psig) to 2068 kPa (300 psig).

12. The process of claim 1 wherein said treated gas comprises 2-30% impurities of said hydrocarbon gas stream.

13. The process of claim 1 wherein said solvent absorption unit contains a solvent selected from the group consisting of methyldiethanolamine (MDEA), piperazine, diethanolamine (DEA), monoethanolamine (MEA), triethanolamine (TEA), diglycolamine (DGA), diisopropanolamine (DIPA), triethylene glycol, dimethyl ethers of polyethylene glycol and mixtures thereof.

14. The process of claim 1 wherein said impurities are selected from the group consisting of carbon dioxide, hydrogen sulfide, and carbonyl sulfide.

15. The process of claim 10 wherein water in said acid gas is condensed and then a portion of said acid gas is sent to be flared, incinerated or routed to a sulfur recovery unit.

16. The process of claim 10 wherein a portion of said acid gas is recycled to said solvent absorption unit.

17. The process of claim 1 wherein said treated gas is cooled and then sent through a water wash before exiting.

* * * * *